United States Patent
Lülker

(10) Patent No.: US 8,807,611 B2
(45) Date of Patent: Aug. 19, 2014

(54) LIFTING UNIT FOR LIFTING A ROTOR OF A WIND ENERGY INSTALLATION

(75) Inventor: Frank Lülker, Aurich (DE)

(73) Assignee: Wobben Properties GmbH, Aurich (DE)

( * ) Notice: Subject to any disclaimer, the term of this patent is extended or adjusted under 35 U.S.C. 154(b) by 40 days.

(21) Appl. No.: 13/636,617

(22) PCT Filed: Mar. 23, 2011

(86) PCT No.: PCT/EP2011/054432
§ 371 (c)(1),
(2), (4) Date: Nov. 20, 2012

(87) PCT Pub. No.: WO2011/117290
PCT Pub. Date: Sep. 29, 2011

(65) Prior Publication Data
US 2013/0058754 A1 Mar. 7, 2013

(30) Foreign Application Priority Data
Mar. 23, 2010 (DE) ..................... 20 2010 004 093 U

(51) Int. Cl.
*B66C 1/12* (2006.01)
*B66C 1/10* (2006.01)
*F03D 1/00* (2006.01)

(52) U.S. Cl.
CPC ............... *B66C 1/108* (2013.01); *F03D 1/001* (2013.01)
USPC ............................. 294/67.1; 294/74; 29/889

(58) Field of Classification Search
CPC ........... B66C 1/108; B66C 1/12; B66C 1/16; B66C 1/18; F03D 1/001; F03D 1/005
USPC ................... 294/67.1, 67.4, 67.41, 74, 81.55; 29/889, 889.1
See application file for complete search history.

(56) References Cited

U.S. PATENT DOCUMENTS

| | | | |
|---|---|---|---|
| 609,417 A * | 8/1898 | Day | 294/74 |
| 1,027,907 A * | 5/1912 | Sammon | 294/67.41 |

(Continued)

FOREIGN PATENT DOCUMENTS

| | | |
|---|---|---|
| DE | 20 2010 003 033 U1 | 7/2001 |
| EP | 2 003 333 A1 | 12/2008 |
| JP | 08-333078 A | 12/1996 |

OTHER PUBLICATIONS

International Search Report for PCT/EP2011/054432 dated Jul. 19, 2011 (3 pages).

*Primary Examiner* — Dean Kramer
(74) *Attorney, Agent, or Firm* — Seed IP Law Group PLLC

(57) ABSTRACT

There is provided a lifting unit for lifting a rotor of a wind power installation. The lifting unit has at least one first sling for looping around a region of a rotor blade on a rotor of the wind power installation, which region is near the rotor blade root, at least one transverse strut, at least one first and second strut or sling portion, and at least one first and second hinge unit. The at least one first and second struts or sling portions extend between the at least one first and second hinge units and the transverse strut. The lifting unit further has at least one second sling having first and second sling portions and a strut. The first ends of the first and second sling portions are fixed to the first and second hinge units. The second sling is adapted to be arranged around a rotor blade stub.

15 Claims, 4 Drawing Sheets

(56) References Cited

U.S. PATENT DOCUMENTS

| | | | |
|---|---|---|---|
| 3,021,166 A * | 2/1962 | Kempel et al. | 294/74 |
| 3,503,646 A * | 3/1970 | Solomon | 294/74 |
| 3,602,544 A * | 8/1971 | Marsh | 294/74 |
| 2009/0025219 A1 * | 1/2009 | Hansen et al. | 29/889 |
| 2010/0018055 A1 * | 1/2010 | Lynderup et al. | 29/889 |
| 2010/0028152 A1 | 2/2010 | Numajiri et al. | |

* cited by examiner

LIFTING UNIT FOR LIFTING A ROTOR OF A WIND ENERGY INSTALLATION

BACKGROUND

1. Technical Field

The present invention concerns a lifting unit for lifting a rotor of a wind power installation.

2. Description of the Related Art

A lifting unit can be used for mounting a rotor to a pod.

BRIEF SUMMARY

One object of the present invention is to provide a lifting unit which can be used in mounting a rotor including the rotor blades to the pod on a pylon of a wind power installation.

That object is attained by a lifting unit according to claim 1.

Thus there is provided a lifting unit for lifting a rotor of a wind power installation. The lifting unit has at least one first sling for looping around a region of a rotor blade, that is near to the rotor blade root, on a rotor of the wind power installation, at least one transverse strut, at least one first and second struts or sling portions and at least one first and second hinge units. The at least one first and second struts or sling portions extend between the at least one first and second hinge units and the transverse strut. The lifting unit further has at least one second sling having first and second sling portions and a strut. The first ends of the first and second sling portions are fixed to the first and second hinge units. The second sling is adapted to be arranged around a rotor blade stub.

In an aspect of the present invention the length of the transverse strut is such that the first and second hinge units do not come into contact with the rotor blades or the rotor of the wind power installation.

In a further aspect of the invention the first and second hinge units have first, second and third ends. The second sling is coupled to the third end. The first sling is coupled to the second end and the first and second sling portions are coupled to the third end of the hinge unit. The third end is rotatably or pivotably coupled to the second end.

Using the lifting unit according to the invention it is possible for example to fit a spinner or a rotor of a wind power installation inclusive of the rotor blades.

The lifting unit preferably has two slings which can extend around the rotor blade in the region of the root of the rotor blade. Those slings can then be connected to a crane hook by way of intermediate members or intermediate elements or hinge units so that the rotor or the spinner inclusive of for example three rotor blades mounted to the rotor can be raised. The two slings which are provided around the rotor blade in the region of the rotor blade root serve to carry the load when lifting the entire structure. The lifting unit is intended to serve to pick up the rotor plus the three at least partially mounted rotor blades from the ground and convey them to the pod on to the pylon of the wind power installation.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
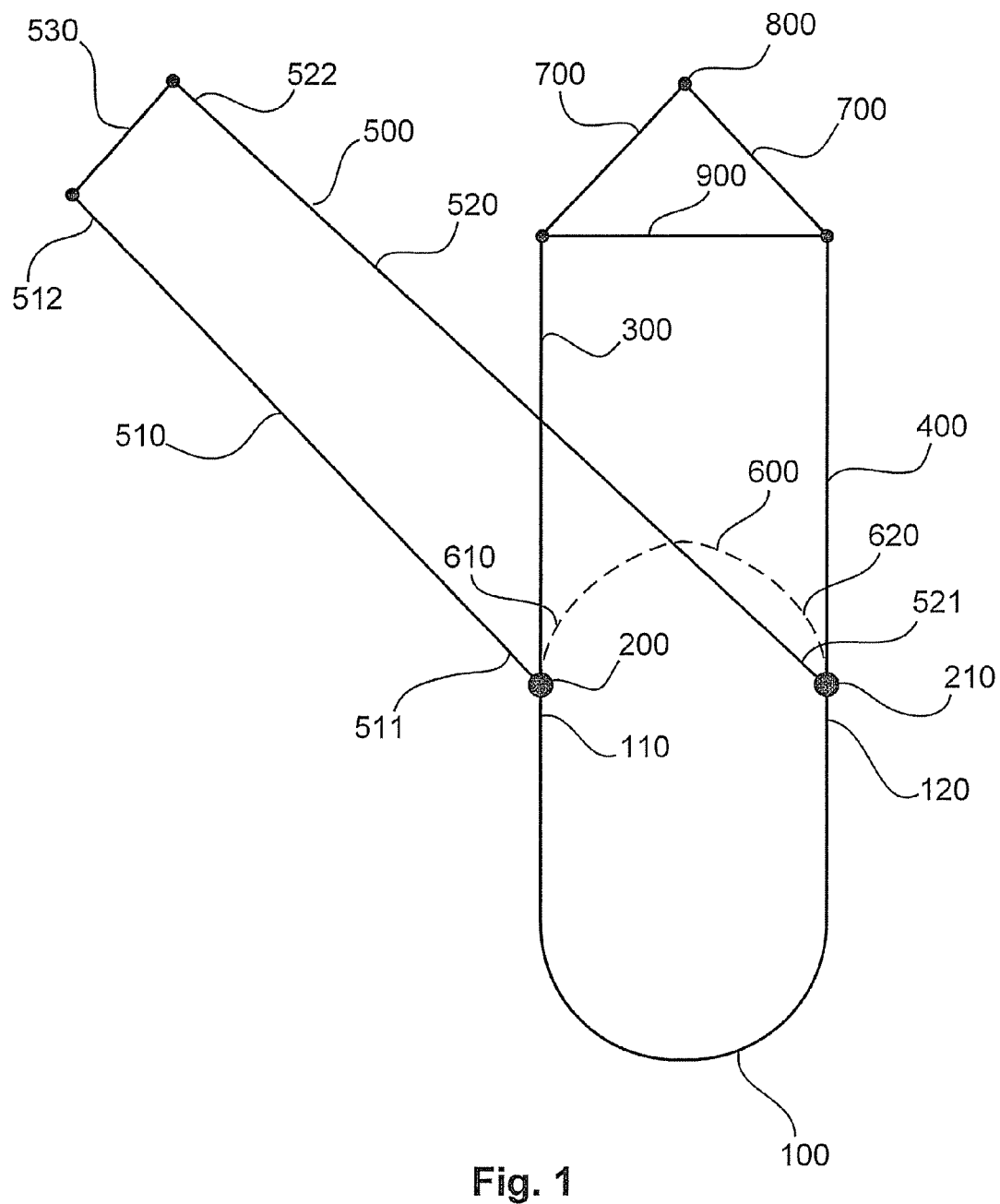
FIG. 1 shows a diagrammatic view of a lifting unit according to a first embodiment.

FIG. 1 shows a diagrammatic view of a lifting unit according to a first embodiment. The lifting unit has a first sling or loop 100 having first and second ends 110, 120, first and second struts or sling portions 300, 400 each having respective first and second ends 310, 320; 410, 420, first and second hinge units 200, 210 and a connecting bar or transverse strut 900 between the second ends 320, 420 of the first and second struts 300, 400. The first end 110 of the first sling 100 is connected to the first hinge unit 200 and the second end 120 of the first sling 100 is connected to the second hinge unit 210. In addition the first ends 310, 410 of the first and second struts 300, 400 are respectively connected to the first and second hinge units 200, 210. The lifting unit further has a second sling 500 having first and second loops or sling portions 510, 520. The first and second sling portions 510, 520 respectively have a first and a second end 511, 521 and a second end 512, 522. The second ends 512, 522 of the first and second sling portions 510, 520 are connected together by way of a third strut 530.

The first and second hinge units 200, 210 each have a first end for receiving a respective end 110, 120 of the first sling 100, a second end for receiving a respective first end 310, 410 of the first and second struts 300, 400 and a third end for receiving a respective first end 511, 521 of the first and second sling portions 510, 520. In this case the third end is rotatable or pivotable relative to the first or second end (preferably the second end).

The first and second struts 300, 400 can also be in the form of sling portions.

The first sling 100 serves to be arranged at the side or end of the rotor blade of a wind power installation, that is towards the rotor blade root. The first sling 100 is therefore of such a configuration that it can fit snugly around the region of the root of the rotor blade.

The transverse strut 900 is preferably of such a length that the first and second hinge units 200, 210 do not contact the rotor blade or the spinner and thus damage them. In addition the third strut 530 is of such a length that the first and second sling portions 510, 520 do not come into contact with the rotor blade or a first portion of the rotor blade.

The third strut 530 is preferably arranged at an end, opposite to the rotor blade root, of a rotor blade stub of a rotor blade of a wind power installation (that is to say the rotor blade can be of a multi-part structure and the rotor blade stub is mounted together with the rotor of the rotor blade installation to the pod using the lifting unit) so that the sling portions 510, 520 extend between the first and second hinge units 200, 210 and the third strut 530 without in that case touching the rotor blade.

Figure 2A:
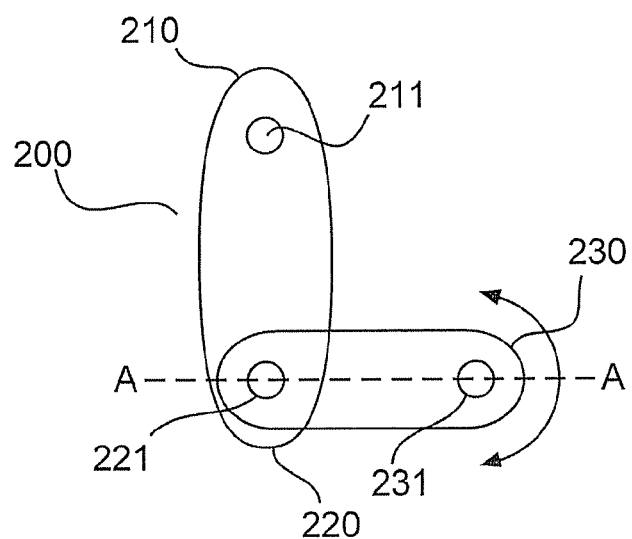
FIGS. 2A to 2C show various views of a hinge unit of the lifting unit of FIG. 1.
Figure 2B:
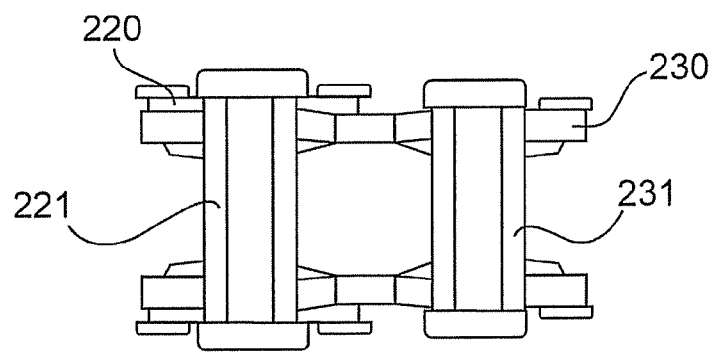
Figure 2C:
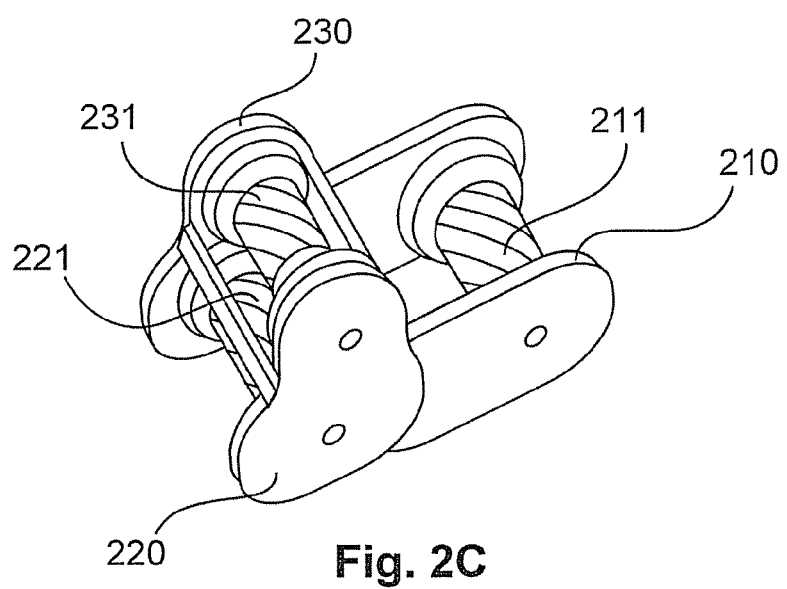

FIGS. 2A to 2C show various views of hinge units that may be used as the first and second hinge units 200 and 210 in accordance with the first embodiment.

FIG. 2A shows a diagrammatic side view of the hinge unit 200 according to the first embodiment. The hinge unit 200 has a first, a second and a third end 218, 220 and 230. In this case the first end 218 is connected to the second end 220 and the third end 230 is connected to the second end 220. In this arrangement the third end 230 is connected to the second end 220 in such a way that it is rotatable or pivotable about the second end 220. Provided at the first end 218 is a first bar 211, provided at the second end 220 is a second bar 221 and provided at the third end 230 is a third bar 231.

FIG. 2B shows a cross-section along line A-A in FIG. 2A. FIG. 2B shows the bar 221 and the bar 231.

FIG. 2C shows a perspective view of the hinge unit 200 according to the first embodiment. The hinge unit has a first end 218, a second end 220 and a third end 230. In this case the third end 230 is rotatably or pivotably connected to the second end 220. The third end 230 with the bar 231 serves to receive one of the first ends 310, 410 of the first and second struts 300, 400.

The first end 218 with first bar 211 serves to receive the first or second end 110, 120 of the first sling 100 and the second end 220 with the bar 221 serves to receive the first or second end 511, 521 of the first or second sling portion 510, 520.

Figure 3:
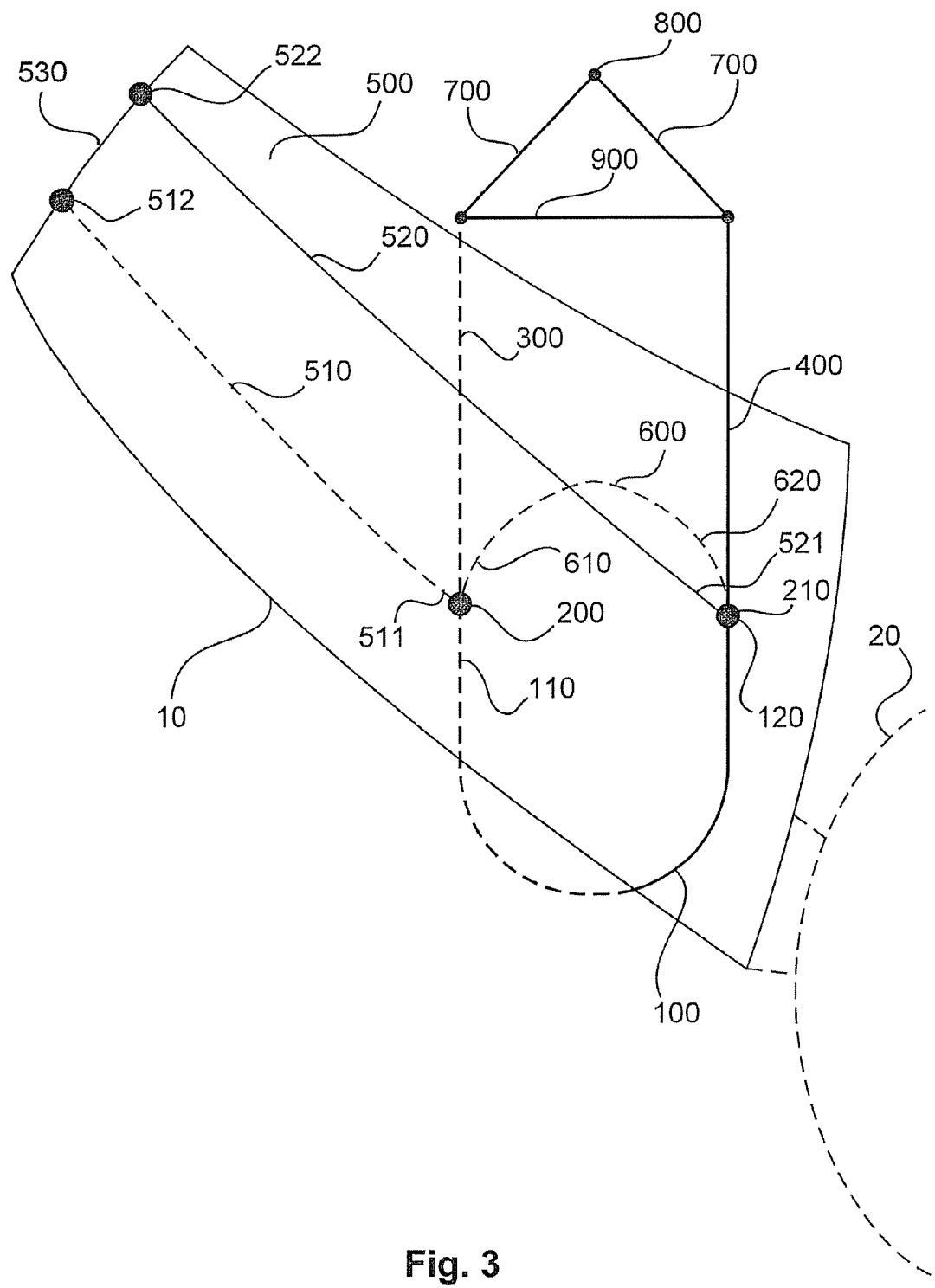
FIG. 3 shows a diagrammatic view of a lifting unit according to the first embodiment with a rotor blade and a rotor of a wind power installation.

FIG. 3 shows a diagrammatic view of the lifting unit according to the first embodiment together with a rotor blade and a pod housing of a wind power installation. The wind power installation has a rotor blade or a rotor blade stub as well as a pod or a pod housing 20. At its one side the rotor blade is connected to the pod 20. The first sling 100 is passed around the rotor blade edge. A second sling 500 is passed around the rotor blade stub. Thus the third strut 530 bears against an end of the rotor blade (stub end). The first strut or sling portion 300 and the first sling portion 510 are passed behind the rotor blade and are shown in dashed lines, and the second strut or sling portion 400 and the second sling portion 520 are passed in front of the rotor blade (in FIG. 3). In that way the lifting unit according to the first embodiment can pick up a rotor blade of a wind power installation.

Preferably two lifting units according to the first embodiment are used, to lift a pod and rotor blades fixed thereto, for mounting to the wind power installation. For example a crane hook can engage a portion 800 to lift the two lifting units of the rotor of the wind power installation.

Figure 4:
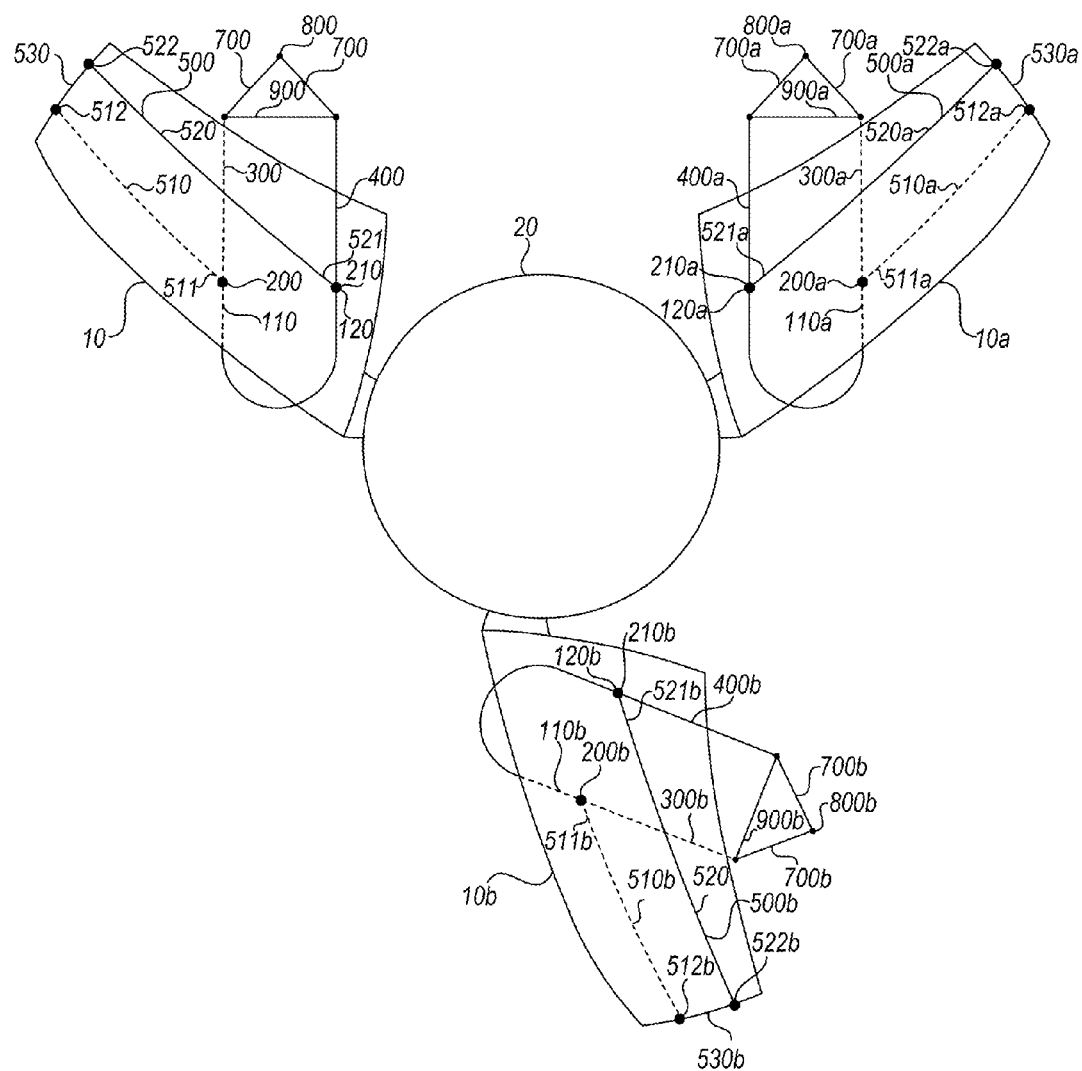
FIG. 4 shows the diagrammatic view of the lifting unit in FIG. 3 with three rotor blades attached to the rotor.

FIG. 4 diagrammatically illustrates a lifting unit used with three rotor blades 10, 10a, and 10b that are each attached to the rotor 20. The first rotor blade 10 represents the rotor blade shown in FIG. 3. The second and third rotor blades 10a and 10b and portions of the lifting unit around the second and third rotor blades have the same structure and function to those described in reference to the first rotor blade of FIG. 3 and are labeled with reference numbers that further include an "a" and "b" respectively.

The lifting unit according to the invention is advantageous because it makes it possible to lift a rotor of a wind power installation from a lying condition (the rotor is lying on the ground). The design configuration of the hinge units 200, 210 make it possible that the lifting unit or the first sling 100 does not slip or scrape along the rotor blade. That can also be achieved by the rotor blades 10 being fixed rotatably to the pod housing or the spinner.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lifting unit for lifting a rotor of a wind power installation, comprising
    a first sling adapted to loop around a region of a rotor blade on the rotor of the wind power installation, wherein the region is proximate a root of the rotor blade;
    a transverse strut;
    first and second struts;
    first and second hinge units, wherein the first and second struts extend between the first and second hinge units and the transverse strut; and
    a second sling having first and second sling portions and a third strut, wherein first ends of the first and second sling portions are fixed to the first and second hinge units, wherein the second sling is adapted to be arranged around a stub of the rotor blade.

2. The lifting unit according to claim 1 wherein the transverse strut is of such a length that the first and second hinge units do not come into contact with the rotor blade or the rotor of the wind power installation.

3. The lifting unit according to claim 1 wherein each of the first and second hinge units has a first, a second and a third end, wherein the second sling is coupled to the third end, the first sling is coupled to the second end and the first and second struts are coupled to the first end, wherein the third end is rotatably coupled to the second end.

4. The lifting unit according to claim 1, wherein the rotor blade is a first rotor blade, the lifting unit further comprising:
    a third sling configured to hold a first portion of a second rotor blade;
    a third hinge unit coupled to the third sling;
    a fourth hinge unit coupled to the third sling;
    a second transverse strut;
    a third strut coupled to the third hinge unit and the second transverse strut;
    a fourth strut coupled to the fourth hinge unit and the second transverse strut; and
    a fourth sling configured to hold a second portion of the second rotor blade and coupled to the third hinge unit and fourth hinge unit.

5. The lifting unit according to claim 4, wherein the first rotor blade and the second rotor blade are connected to a rotor of a wind power installation.

6. The lifting unit according to claim 4, wherein the first and second rotor blades have a rotor blade stub, a portion of the second sling being proximate the first rotor blade stub and a portion of the fourth sling being proximate the second rotor blade stud.

7. The lifting unit according to claim 4, wherein the fourth sling has third and fourth sling portions and a second strut, and first ends of the third and fourth sling portions are coupled to the third and fourth hinge units.

8. A lifting unit comprising:
    a first sling portion configured to hold a first portion of a rotor blade;
    a first hinge unit coupled to a first end of the first sling portion;
    a second hinge unit coupled to a second end of the first sling portion;
    a transverse strut;
    a second sling portion coupled at one end to the first hinge unit and at the other end to the transverse strut;

a third sling portion coupled at one end to the second hinge unit and the other end to the transverse strut; and a fourth sling portion configured to hold a second portion of the rotor blade, the fourth sling portion coupled at one end to the first hinge unit and at the other end to the second hinge unit.

9. The lifting unit according to claim 8, wherein the rotor blade is connected to a rotor of a wind power installation.

10. The lifting unit according to claim 8, wherein the traverse strut is a first traverse strut, wherein the fourth sling portion includes a second traverse strut, the rotor blade having a rotor blade stub proximate the second traverse strut.

11. The lifting unit according to claim 8, wherein the first and second hinge units each include a first element and a second element, the second element being rotatably coupled to the first element.

12. The lifting unit according to claim 11, wherein the second elements of the first and second hinge units include respective first and second ends, the first end of the second element of the first hinge unit is coupled to the one end of the fourth sling portion and the second end of second element of the first hinge unit is rotatably coupled to the first element of the first hinge unit, and the first end of the second element of the second hinge unit is coupled to the other end of the fourth sling portion and the second end of the second element of the second hinge unit is rotatably coupled to the first element of the second hinge unit.

13. A method comprising:
    connecting a rotor blade to a rotor;
    arranging a first sling around a first portion of the rotor blade;
    coupling the first sling to first and second hinge units;
    arranging a second sling around a second portion of the rotor blade;
    coupling the second sling to the first and second hinge units such that the second sling is rotatable relative to the first sling;
    connecting the first sling to a crane hook; and
    lifting the rotor blade.

14. The method according to claim 13, wherein the first portion of the rotor blade is along a width of the rotor blade, and wherein the second portion of the rotor blade is along a portion of a length of the rotor blade.

15. The method according to claim 13, wherein arranging a second sling around a second portion of the rotor blade comprises arranging the second sling around a stub of the rotor blade.

* * * * *